US007483909B2

(12) United States Patent
Sena et al.

(10) Patent No.: US 7,483,909 B2
(45) Date of Patent: *Jan. 27, 2009

(54) SYSTEM, METHOD AND APPARATUS FOR CONVERTING AND INTEGRATING MEDIA FILES

(75) Inventors: Raffaele Sena, Cupertino, CA (US); Nathaniel D. Monson, Mountain View, CA (US); Kevin Lynch, Los Altos, CA (US); Keith Kitani, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/381,117

(22) Filed: May 1, 2006

(65) Prior Publication Data

US 2006/0195614 A1   Aug. 31, 2006

Related U.S. Application Data

(63) Continuation of application No. 09/833,236, filed on Apr. 10, 2001, now Pat. No. 7,039,643.

(51) Int. Cl.
*G06F 17/30* (2006.01)

(52) U.S. Cl. ............... 707/101; 707/104.1; 707/102; 707/201

(58) Field of Classification Search ............ 707/3, 707/101, 10
See application file for complete search history.

(56) References Cited

U.S. PATENT DOCUMENTS 5,815,655 A * 9/1998 Koshiyama ............... 714/45
6,336,124 B1 * 1/2002 Alam et al. ............... 715/523
6,441,831 B1 * 8/2002 Abramowitz et al. ....... 715/716
6,487,564 B1 * 11/2002 Asai et al. ................. 715/201
6,560,651 B2 * 5/2003 Katz et al. ................. 709/229
6,587,835 B1 * 7/2003 Treyz et al. ................. 705/14
6,616,700 B1 * 9/2003 Thum et al. ............... 715/273
6,708,189 B1 * 3/2004 Fitzsimons et al. ........ 707/205
7,051,272 B1 * 5/2006 Ten Kate .................. 715/200
2001/0023450 A1 * 9/2001 Chu ......................... 709/231
2003/0014415 A1 * 1/2003 Weiss et al. ................ 707/10

* cited by examiner

*Primary Examiner*—Cam Y T Truong
(74) *Attorney, Agent, or Firm*—Fulbright & Jaworski, L.L.P.

(57) ABSTRACT

The present invention teaches a digital media file conversion and integration system including a server coupled to the Internet to allow users to download media files to a server the Internet. The system contains devices to screen, compress, and update the media files, devices to break down the media files into low level components, devices to convert one or media files to an intermediate format and then combine the intermediate formats to create an output format, devices to convert output formats to a presentation file, electronic storage to allow third party access to the presentation file through the Internet or email. Presentation files can be created for electronic devices such as portable digital assistants or cellular phones. Users can choose from several output formats. Users can subscribe to the presentation service or pay per use. In an alternate embodiment, users can author digital media files on a personal computer and download the authored file to the presentation conversion system.

9 Claims, 16 Drawing Sheets

SYSTEM, METHOD AND APPARATUS FOR CONVERTING AND INTEGRATING MEDIA FILES

This application is a continuation of U.S. application Ser. No. 09/833,236 filed on Apr. 10, 2001, now U.S. Pat. No. 7,039,643 which is incorporated herein by reference.

FIELD OF THE INVENTION

This invention relates generally to digital media conversion and integration. More particularly, the invention teaches automated systems which allow multimedia presentations to be derived from one or more multiple digital media files and are delivered in a desired format through the Internet or software download.

BACKGROUND OF THE INVENTION

There are many formats for various digital media files which include sound, video, and presentation files. Many of these formats are dependent on the type of software in which the media file was created. For example, a very popular presentation software program called POWERPOINT® created by Microsoft corporation for the personal computer was developed and marketed in the early 1990s. This presentation program integrated text, pictures, diagrams, and graphs into a set of frames, commonly called "slides," which could be "played" back sequentially either manually or timed to create a presentation. In the first embodiments, the capabilities of this software were limited; however, with the progress of computing power, memory and digital media compression techniques, the presentation software began to assist in developing traditional business presentations.

The POWERPOINT® and other software system is represented by prior art FIG. 1. Other integrated presentation software was made by other manufacturers such as Claris (CLARIS, etc.), Harvard Graphics, and Persuasion. A typical presentation consists of 3 active screens 100, 120, and 140 and two pause screens 110 and 130 over five time periods T1-T5. Screen 100 is composed of text 102 and a picture 104, screen 120 is composed of a picture 122 and a graph 124, screen 140 is composed of a histogram 142 and a body of text 144.

As demand for information increased, multimedia presentation software programs began to replace some more traditional forms of media like print and video and even the in-person business presentation. Needless to say, with the advancement of the Internet, graphics, text, sound and video presentations, demand increased for information services. Although a presentation file could be downloaded from an Internet site or sent via email, presentation software like Powerpoint® could not be displayed over the Internet in a multimedia format.

Although Powerpoint® now has a built-in feature which allows a user to add a sound file to an individual frame, this add-in procedure requires that the user will have broken up each sound file into the appropriate length for the frame. This procedure can be extraordinarily time consuming and require an average user to develop advanced multimedia production skills in order to add a simple sound file to a "slide."

Other multimedia software such as QUICKTIME® developed by Apple computer, REAL PLAYER®, developed by Real Networks or MICROSOFT MEDIA PLAYER® developed by Microsoft can integrate digital video and sound while making a media file accessible over the Internet. However, these proprietary formats must be created by complicated multimedia editing software programs. Quicktime® can also incorporate many times of media file formats into the Quicktime® file, presented on the Internet. However, these files must all be extensively authored and incorporated manually by a Quicktime® authoring software user. A Quicktime® file creation schematic is depicted in FIG. 2. A virtual player is typically composed of a screen 150 a virtual viewing area 152 and virtual controls 154 which control the direction and speed of the video or presentation.

There are currently computer software products which allow for some conversion of digital video and audio media in an authoring capacity only. Such software products are prohibitively expensive for consumers and extremely complex to learn and generally designed for multimedia production professionals only. An example of this is MEDIA CLEANER® published by Media 100, Inc., represented by FIG. 3. This multimedia computer program allows a web professional to take digital videos in several basic formats and turn it into a specific digital video format appropriate for web publishing and streaming.

Media 100 also has software which converts digital audio with digital sound (Data translation of Marlboro, Mass. currently holds U.S. Pat. No. 5,506,932, a system for synchronizing digital video to digital audio) which is represented by FIG. 4. However, such software tools meant for authoring Internet multimedia documents and are geared towards use by highly trained multimedia professionals. Other similar computer software programs allow digital video to be put into the Quicktime®, Microsoft Media Player® and Real® or MP4 formats. The proprietary nature of these software authoring products is useful for the media production professional, but is clearly not designed for the average consumer needing a multimedia business presentation quickly and inexpensively.

Additionally, these multimedia computer programs use virtual media software called "players" and need to be installed onto a personal computer in order to play back the proprietary multimedia files. Often these players are very large computer programs which have to be downloaded from a proprietary Internet site or installed by CD-ROM. Most of the products cost money and take time to download. Although Internet connections are getting faster, if a viewer does not have a particular proprietary media player installed on their computer they may not wait to take the necessary steps to view a presentation. For example, if a business wanted to place a promotional multimedia digital file on its Internet site, they would need at least three formats because the different multimedia formats are not compatible with each other and must be posted and downloaded separately in order to reach a variety of customers using the various software formats, such as Real, Windows Media, Quicktime, etc. This could be extraordinarily expensive and time consuming as well as create an Internet site that uses more computer memory and looks confusing.

Not only does dependence on one type of multimedia format give rise to logistical problems in getting multimedia information to consumers, there are also serious antitrust and free market considerations as well. These software market problems may severely limit the ability of consumers to choose the media format they most prefer as opposed to the media player format that currently dominates the software market.

Currently, there are many types of digital media formats, which can be divided into proprietary software formats and platform formats. Proprietary software formats can only be utilized by a specific company software, like the Real® and Window Media® "players" described above. In contrast, platform formats are software format standards usually developed by a group of industry experts. Such media formats include JPEG, MP3, etc. and usually cost nothing to use, because they are developed in the "open platform" setting. The Internet presentation languages XML and DHTML are languages that have been developed in an "open platform" setting and are therefore free for programmers to use (although programmers in these languages may choose to purchase a particular version).

It is important to note that unlike popular word processing computer programs or spreadsheet computer programs, there are not easy conversion options for these multimedia player files. Therefore, a Microsoft Word® computer program will be able to open a Wordperfect® document, but a Real player® will not be able to open a Quicktime® or Powerpoint® file for viewing.

In addition to the commercially available multimedia formats, several companies offer software products in which a viewer can use the company's own "player" to view a multimedia file. In almost all instances, this is the only way in which the final digital media format can be viewed. Companies that are using this type of technology include: Digital Lava, Eloquent, Brainshark, Loudeye, and Presenter.com.

Instant Presentation™ developed by Presenter.com, is a product that allows a consumer to integrate voice/sound with a Powerpoint™ presentation. In contrast to the present invention, the voice/sound file is integrated by telephone and therefore in limited in the number of ways that sound be applied to the presentation. The 2.0 version of INSTANT PRESENTATION™ appears to have some customizing capabilities for presentations and allows a consumer to track the amount of times the presentation has been viewed. However, the INSTANT PRESENTATION™ product does not break down digital media into components, but captures images as a whole, which limits the types of conversions that this product may perform and the number of "players" that this product supports.

Digital Lava produces a multi-media product called "FIRE STREAM," which runs on an open-ended architecture. This product allows multiple media technologies can be integrated and the HOTFOOT™ product from Digital Lava integrates sound and animation for Powerpoint® which can then be accessed by a viewing consumer. Like the above-discussed INSTANT PRESENTATION™ this product does not break down a digital media file into its low-level constituent components and is therefore limited in the number of types of conversions that it can perform. Eloquent appears to be using an open ended architecture for a "rich media" player. This software product is limited in the same way the above products in that it does not break down the digital media file. The end multimedia product created by this software must be viewed on a large Eloquent player plug-in. This product does not appear to have a fully automated solution which will allow self-service recording to turn into an Internet ready presentation. The Brainshark™ product is limited in the same manner that it does not decompose a file into the constituent components, even though it allows a user to record a voice over the phone to synchronize to a Powerpoint® presentation.

Loudeye's MEDIA SYNDICATOR, is introduced as both a product and a service. Also, it looks like it is primarily designed to sell and distribute streaming media to consumers for syndication and consumption through e-commerce, which is not in the same industry as the present invention, nor is a conversion system. Real Producer® is another software product that will allow delivery of a presentation, but it will create output for only one type of player.

As would be appreciated by one skilled in the art, the above discussed products require more bandwidth to execute the delivery of presentations because the non-decomposed files require more bandwidth than files that have been broken down into their base components.

What is needed is a combination of software and hardware which can automatically break down a variety of digital media into component elements such as text, fonts, shapes, pictures, videos, etc., especially animations, so that the digital component data can be recreated in a multiple of presentation formats for various viewing devices, such as web browsers, PDAs, set top boxes, and mobile telephones. In addition, this combination of software and hardware should not absolutely require proprietary software or absolutely require a viewing consumer to have the viewer or plug-in in order to see a digital media presentation. What is also needed is a method for treating a digital media presentation so that the bandwidth needed to deliver such presentations is reduced.

SUMMARY OF THE INVENTION

The present invention addresses many of the above-listed problems by providing an integrated system, method and apparatus for converting and integrating multiple digital media files including proprietary software file formats, into a single desired digital multimedia format, which can viewed as a presentation over the Internet or played on a personal computer. The subscriber or user can choose the output presentation from a variety of formats. The present invention uniquely breaks a digital media file into its components, so that it may be reconstructed into a many formats and delivered to a user with only the necessary components. The minimalization in the number of digital media components needed to deliver a presentation reduces the bandwidth needed to deliver such a presentation.

The preferred embodiment of the invention allows a user to choose from a variety of output formats of the integrated digital media format and then prompts the user to upload the media files that are to be changed into the presentation file. The invention then allows the user to upload the user's file inputs, such as Powerpoint®, animation, or audio file, screen the files, load the digital media files into a conversion engine through the Internet, and convert and integrate the digital media files into the user's desired output format. The invention also includes a system for the creation of a generic web presentation format from the converted output format which may be accessed by multiple users through the Internet or a corporate intranet Although one embodiment of the present invention utilizes a special media plug-in to allow a third party to view the output presentations via the Internet, it is not necessary to load a proprietary plug-in onto a computer to achieve the final desired output for viewing. It is a feature of the present invention that allows a user to choose if they want a media player output feature. Hence the invention does not require a viewer to have software, other than a web browser, installed on a personal computer before viewing the output format.

An alternate embodiment of the invention also provides a specific Internet presentation software authoring tool for combining a proprietary software digital media file such as Powerpoint® with any digital media file. This file integration software may be executed on a personal computer with substantially less effort than existing proprietary technology. The integrated file is then delivered to the above-discussed presentation publishing system and allows the presentation file to be viewed as a web presentation for third parties via Internet access, intranet access, or email.

The present invention is far more cost effective than other web presentation versions of multimedia files that are created manually. Hence, the automated presentation capabilities of the present invention make it far more efficient and less expensive to implement and update than the above listed art, where such competitors are performing these tasks manually or using multiple server components including a telephone server.

These intermediate digital media files can then be integrated by a transformation module. This integration may or may not require a special digital signal in order to synchronize the multiple digital media input, but such a "synchronization signal" can be added by the transformation engine in order to facilitate integration.

In an alternate embodiment the invention converts the media input files directly to the desired output formats without first converting the input files to intermediate digital media files. This can be accomplished by uploading files to a specific Internet site which then downloads them into the present invention.

The integration of the individual digital media files may be executed on a server by uploading the digital media files to the server from a personal computer, or by running the software on a personal computer where the digital media files are stored (as in the "Presedia Producer" software product).

After the multiple digital media inputs have been integrated into a single multimedia digital file, the invention converts the multimedia digital file into various formats which can be accessed by a consumer. The invention then allows the user to publish the multimedia file on a web-accessed server for multiple user access via the Internet from any location that has web access. The consumer may also download the multimedia presentation to a computer from a server.

The present invention enables a consumer to view the new integrated digital media presentation without requiring a specific software "player" or viewing platform. This is in contrast to some of the technology discussed above in the prior art. Although the applicant's invention teaches a method of delivery though the Internet to both the user consumer and viewing consumer, Internet or network delivery is not a necessary part of the present invention. The invention also teaches future plans for an automated e-commerce component, but it is not currently utilizing this aspect of invention.

DETAILED DESCRIPTION OF THE PREFERRED EMBODIMENTS

In the following detailed description of the embodiments, reference is made to the drawings that accompany and that are a part of the embodiments. The drawings show, by way of illustration, specific embodiments in which the invention may be practiced. Those embodiments are described in sufficient detail to enable those skilled in the art to practice the invention and it is to be understood that other embodiments may be utilized and that structural, logical, and electrical changes as well as other modifications may be made without departing from the spirit and scope of the present invention.

Definitions

Throughout the description of the invention the following expressions are used:

"Proprietary format" indicates software file format which is controlled by a particular company.

"Platform format:" non-proprietary file formats, generally developed by industry groups, include JPEG, MPEG, etc. accessible by all users without software purchases or other licensing fees.

A "Digital media file" Any file which contains coded information which when decoded by executing media software will deliver sound, text, graphs, or, video that contains more than mere text or numerical manipulations.

"Module" is meant as a synonym for a code segment executable in computer language that will perform a series of function on data, which is usually self-contained and can be called by other modules or systems.

"Executable at X" means that the X system or X module calls a function or module.

"Code segment" is a series of instructions which can be compiled and executed by a computer in order to perform a set of functions.

"Low-level components" is a term used to describe the basic data structures which are extracted from data stored in particular software formats. For example a picture may be stored in a proprietary graphics file format in which superfluous information is contained when the picture is converted into pixel information which contains only information on pixel location, brightness and color.

In the specification the expression "module" is used, in the claims "code segment" is used. These terms can be interchanged, although "code segment" is broader than module in theory, because a code segment can be executed by any system. A module must generally be "called.

Figure 1:
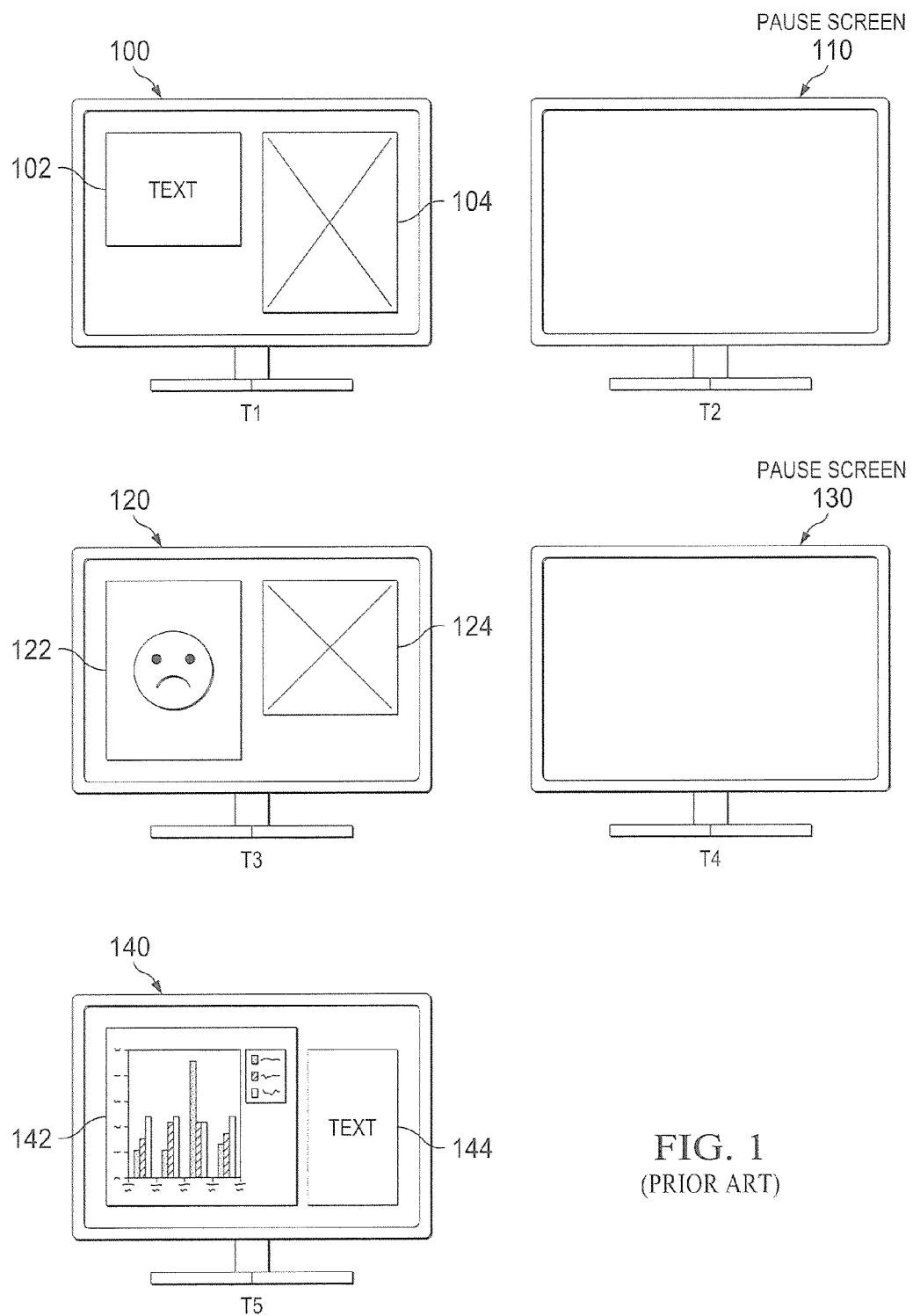
FIG. 1 is an illustration of prior art Powerpoint® or equivalent presentation view.
Figure 2:
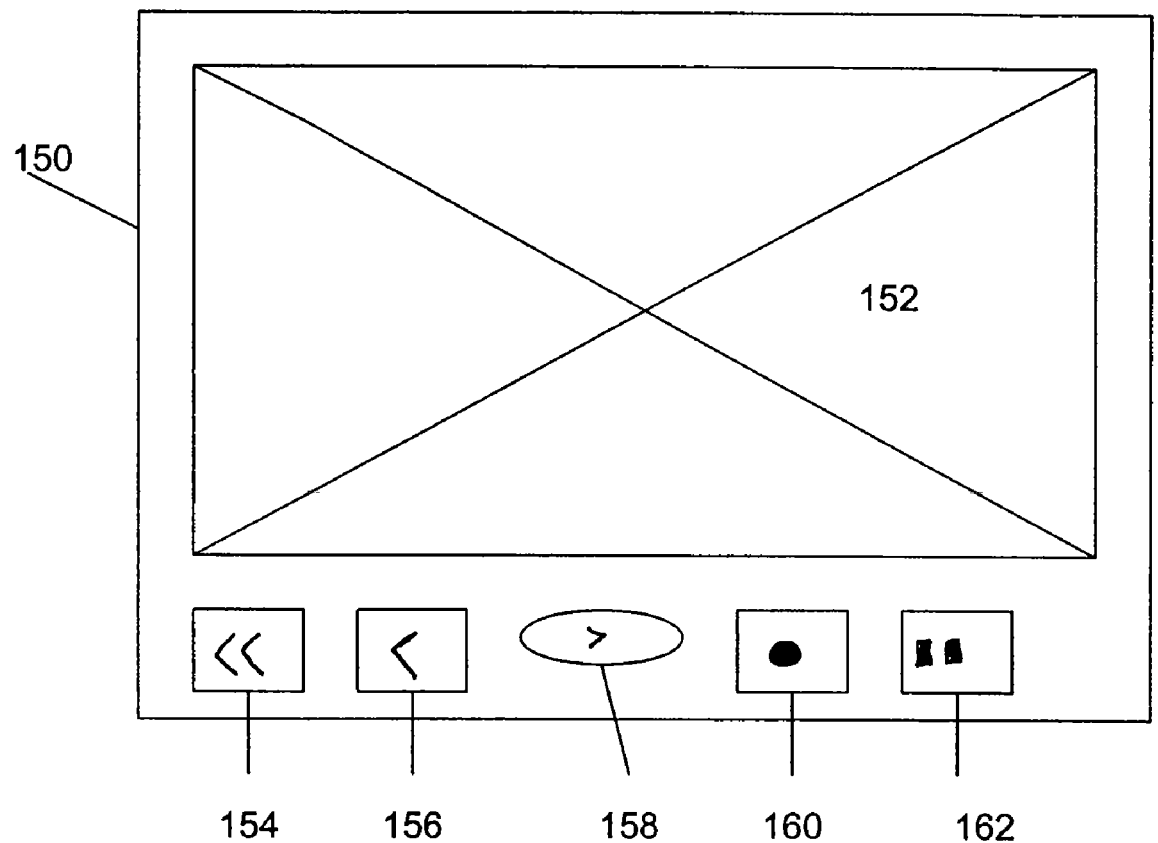
FIG. 2 is a schematic of prior art Quicktime® view.
Figure 3:
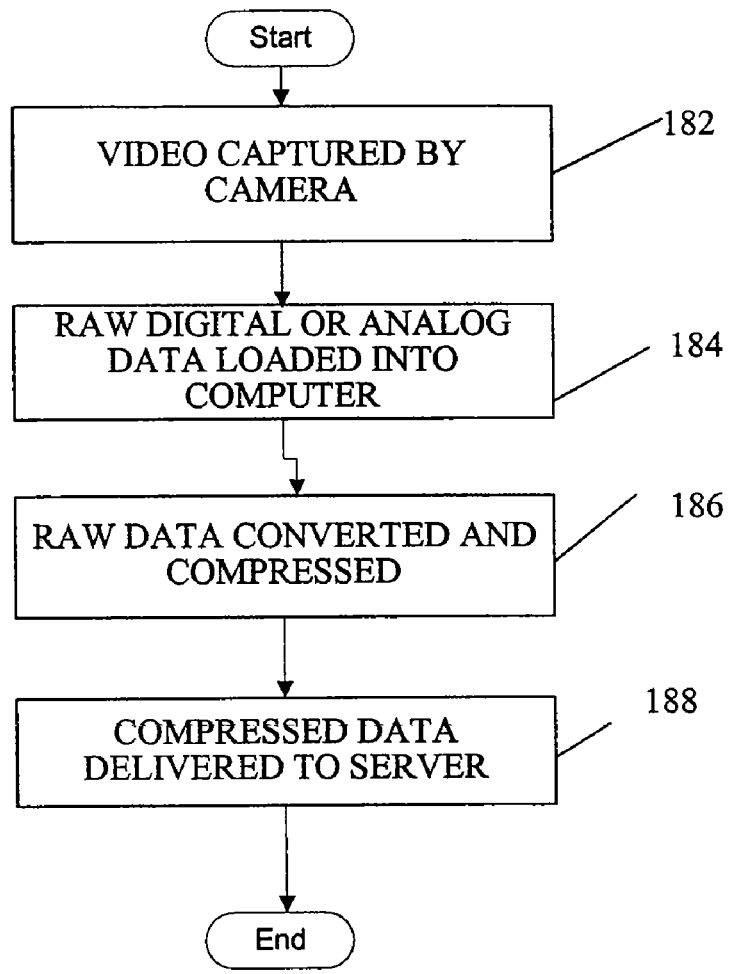
FIG. 3 is a schematic of prior art Media Cleaner multimedia video adaption system.
Figure 4:
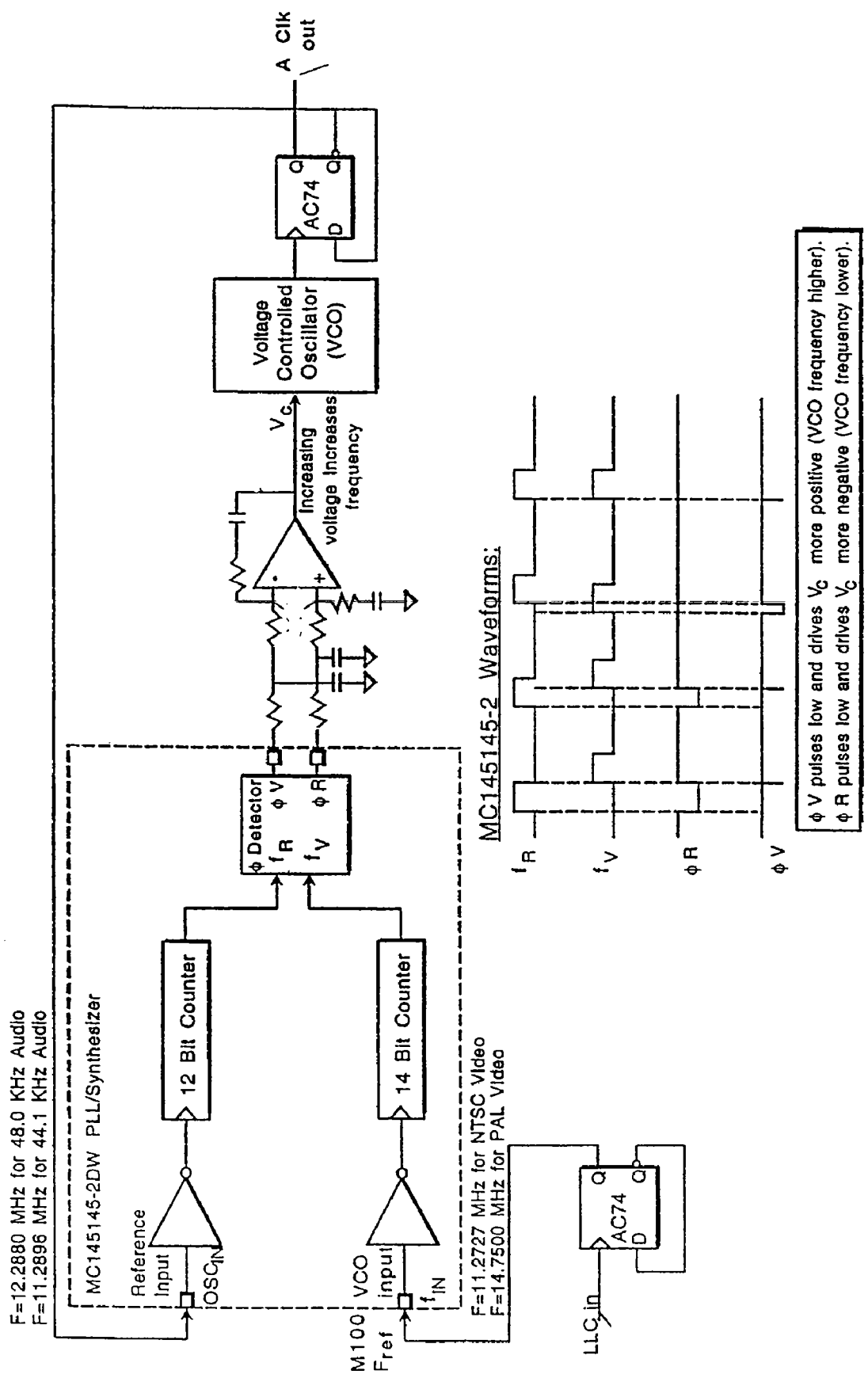
FIG. 4 is a schematic of prior art example in which digital video and digital audio are synchronized.
Figure 5A:
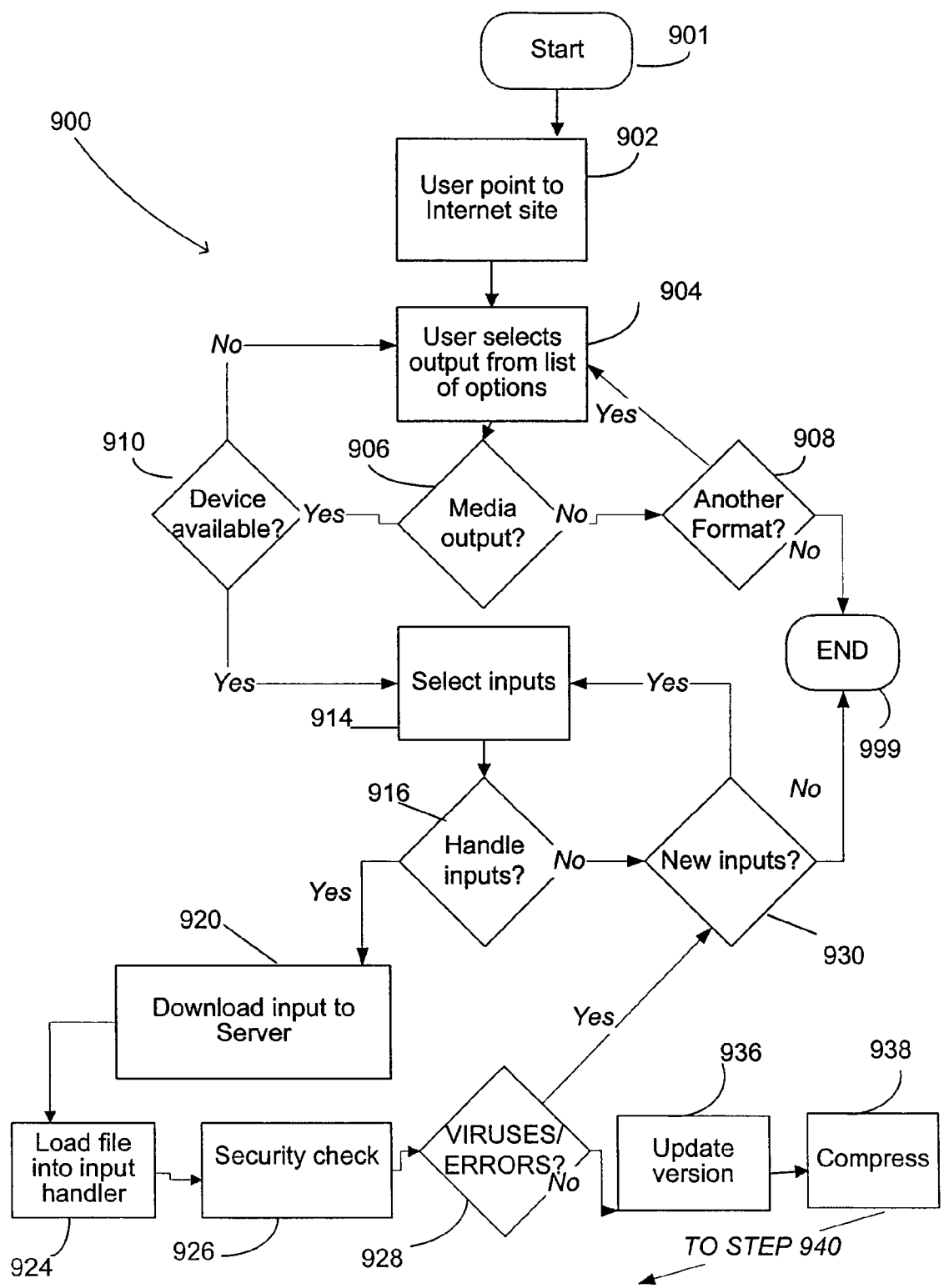
FIG. 5A is a flow diagram of the method of digital media conversion and integration in accordance with one embodiment of the present invention.
Figure 5B:
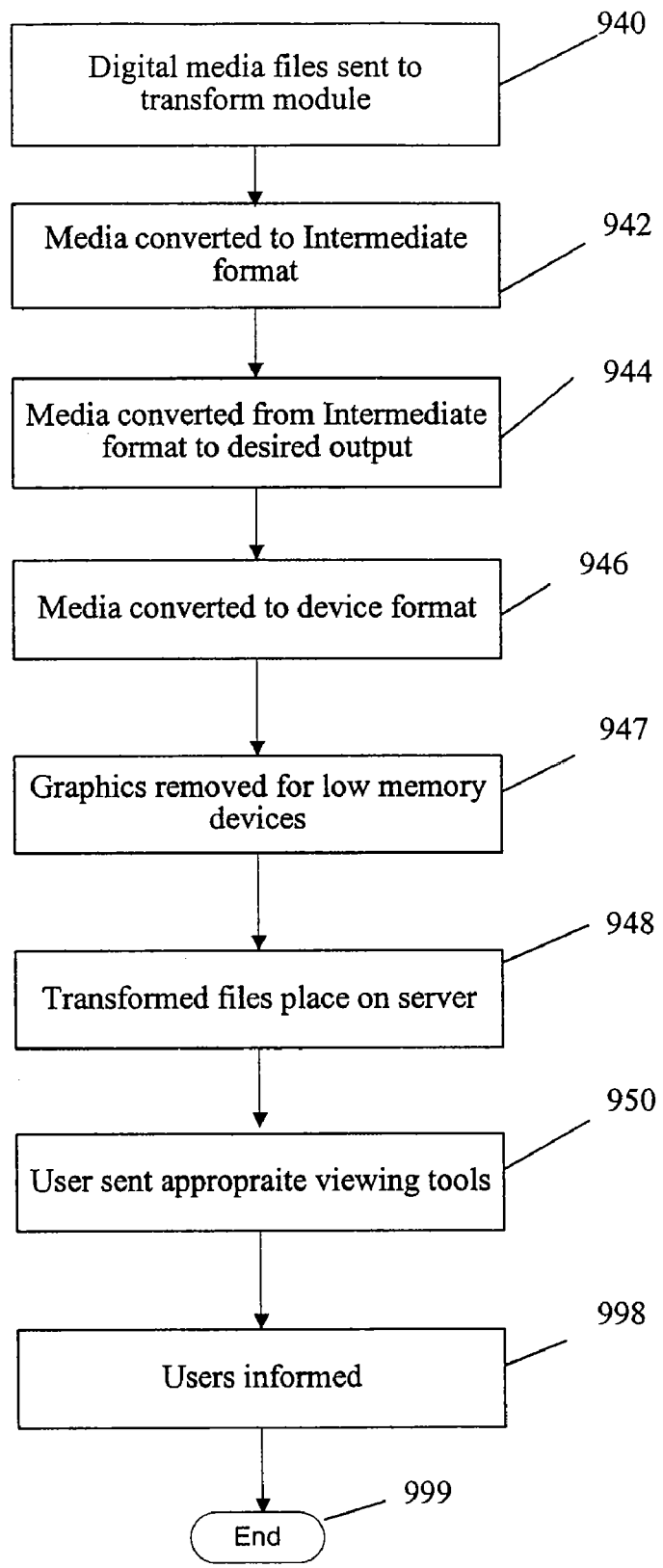
FIG. 5B is a continuation of the flow diagram of 5A.

Referring now to FIG. 5A-B a method 900 for converting and integrating multiple digital media files is shown. In step 902 a user goes to a proprietary website through the Internet or other appropriate connection. After the user is connected to the website, an HTML script is loaded onto the user's computer that allows a user to choose a desired media output in step 904.

In step 906, the system determines to make sure that it can deliver the desired media output. In step 908 if it cannot deliver the desired output it asks the user if the user wishes for another digital media output. If the user does not wish another output then the program exits in step 999, if user does the system is returned to step 904.

In step 910, the system asks the user for a device specific output like PDAs, regular web presentation, etc. The system determines if it can match the desired digital media output to the desired device in step 912. If there is no match, the system asks the user for another device specific output in step 913. If the system cannot deliver the desired output then the system is exited in step 999. Otherwise the program returns to step 910.

In step 914, the user chooses the desired inputs from a list of possible digital media inputs. In step 916, the system decides whether it can convert and integrate the possible digital media inputs. If the system can perform the conversion it proceeds to step 920, but if it cannot the system checks to see if it can convert the digital media format input to a format that it can convert to the desired digital media output in step 918. If it cannot it informs the use in step 998 and exits the program in 999.

In step 920 the system prompts the user to a screen which allows the digital media input files to be downloaded to the system. The user attaches the files to such a prompt either by manual command or a special screen and downloads the files to the temporary storage server 418 in step 922. In step 924 the digital media input files are loaded into the input handler module 420. In step 926 the files are checked for security problems such as viruses and for uncorrectable file errors. In step 928 if the files contain viruses or uncorrectable errors, the system requests a new input from the user in step 930. In step 932, if the user answers that they do not have new input the system in exited in step 999. If the user has another digital media input file the system returns to step 920.

In step 934, the system determines whether the digital media input files are old versions, if they are and need updating then they are updated in step 936, if not they proceed to step 938 in which the system compresses the file for the conversion module.

In step 940 the digital media files are processed by the digital media transform module 460. In step 944 the intermediate digital media file is converted to the desired output format. In step the 946 digital media output file is converted to the appropriate device. In optional step 947 graphics, audio, and video is removed and/or transformed so that the output file may be viewed by lower memory devices, such as PDAs or handheld computers. In step 948 this digital media output is placed in the system server 492 for access by the user or other third parties. In step 950 the user is sent an appropriate connection tool to access the digital media or to send to third parties. In another embodiment the user is simply emailed the digital media file if the user so determines that is appropriate delivery mechanism.

Figure 6:
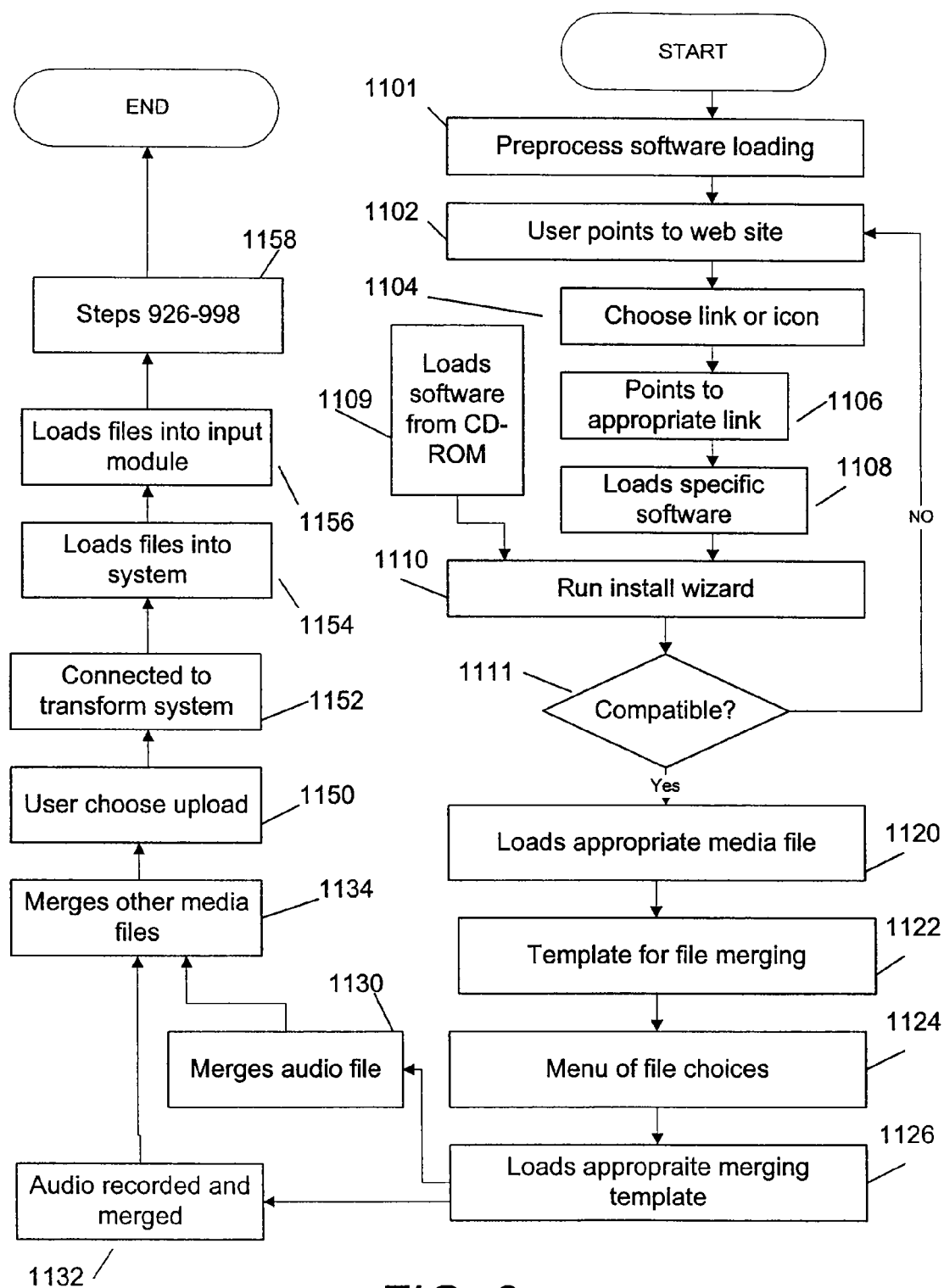
FIG. 6 is a flow diagram of the process involved in the alternate embodiment.

Referring now to FIG. 6, an alternate embodiment method for converting and integrating digital media files with authoring tools 1100. A preprocess step 1101 requires that the user loads the appropriate media software into the computer. In this example, the computer has been preloaded with Microsoft POWERPOINT®, but the invention may be used with other proprietary media platforms as well.

In step 1102 a user goes to an Internet site and chooses the link or icon to the appropriate authoring tool in step 1104. For example, the site may include links for software to author POWERPOINT®, Macormedia® FLASH®, simple XML, etc. In step 1106 the server that controls the Internet site loads the HTML (or XML) software connection on the user's computer and in step 1108 loads the software into the computer.

Alternately, in step 1109, the user simply loads the software the personal computer via CD-ROM or floppy disk. In step 1110, the user runs the install Wizard which checks in step 1111 to see if the appropriate software is loaded, if it is not the user is informed and the system is returned to step 1104. If the appropriate media software authoring is loaded then the user can press an icon to start the software in step 1112.

In step 1120, the authoring tool software loads a Powerpoint® or other appropriate media file into a buffer. In step 1122, the software places a template over the media file. In step 1124, the software gives the user a menu of choices of the format. In step 1126 the software executes the desired choice. If the user selects the powerpoint-audio option, in step 1130 the software executes instructions which either adds an audio file or in step 1132 allows the user to record an audio file while the Powerpoint® presentation is playing. In step 1134 the system adds any other media files to the Powerpoint® file. In step 1150, the user chooses the "upload" option, which connects the personal computer to system 1000 in step 1152. In step 1154 the software loads the modified file to system 1000, which then places the file in input handler module 1020 in step 1156. Steps 926-998 are then performed, but step 940 can be skipped.

Figure 7:
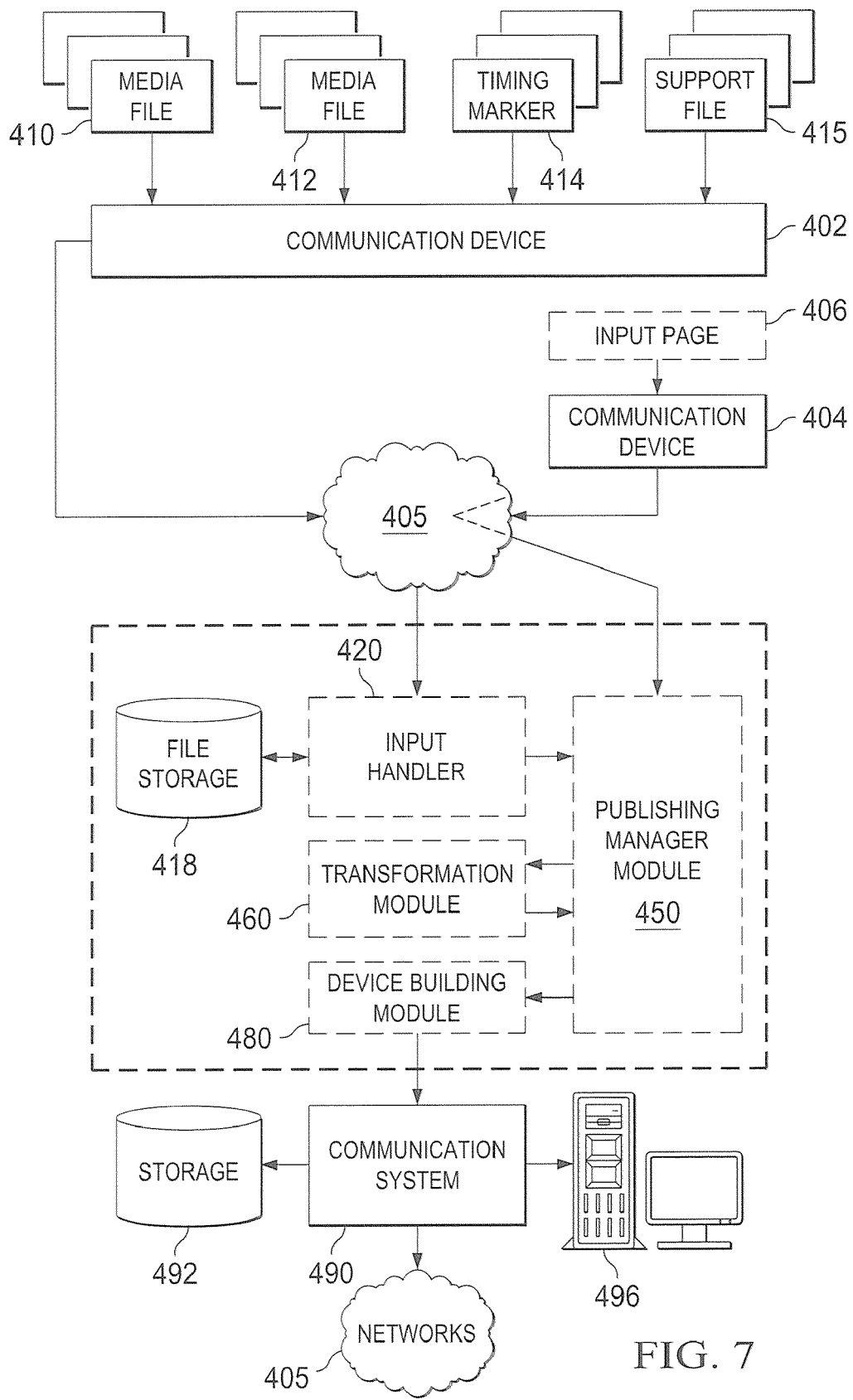
FIG. 7 is a block diagram of a digital media conversion and integration system.

Referring now to FIG. 7, a digital media conversion and integration system 400, which includes a first communications devices 402, a second communications device 404, and a customer request input page 406. The system also includes two distinct digital media files 410 and 412, respectively, which may be contained in one data storage file or two, an optional timing marker or timing information file 414, and an optional presentation support file 415. The system also includes an output media file 599 and presentation data 598.

The system includes a publishing manager module 450 which controls and schedules the entire process of converting, integrating and publishing and distributes the digital media files 410 412, and 414, and 415 between the modules, temporary file storage 418, and a digital media input handler module 420. The system also includes a digital media transformation module 460, a device building module 480, an output communications device 490, a data storage 492, an optional network server 496 connected to an email delivery device 494 or an Internet connection 498.

A client desires to convert one or more digital media files, such as a Powerpoint® file and an audio file, 410, 412 into a presentation that can be accessed by third parties over the Internet 405 or a network server 496. The client uploads the media files 410, 412, and the optional timing and supplementary files 414, 415 to the system 400 via an Internet or email connection 402. The client also specifies which type of presentation output they wish to be accessed and what type of device in the customer input request page 406. The input request 406 is passed along to the Publishing Manager Module 450, which controls the overall process of the system 400.

The input handler module 420, checks and compresses the digital media files 410, 412 and then passes them along to the publishing manager module 450. The publishing manager module 450 adds the relevant information to the files 410, 412, such as the customer output request 406 to the files 410, 412 and passes files to the digital media transformation module 460.

The digital media transformation module 460, takes the two digital media files 410, 412, breaks them down into low level data components and then converts them to an intermediate format where two or more media files can now be integrated. The media files 410, 412 are integrated and converted again into the desired media output file 599. The media output file is then passed back to the publishing manager module 450 and if the file 599 is ready for output, it is passed to the device building module 480 where the file is made ready for the web, a PDA, etc., in a presentation format 598. The presentation 598 and the file 599 are then stored on a computer readable medium 492 and, at the client's direction downloaded onto a server 496 or placed in a location where the presentation can be viewed via the Internet or email 405. Each of the processes in modules 420, 450, 460, and 480 is detailed below.

Figure 8A:
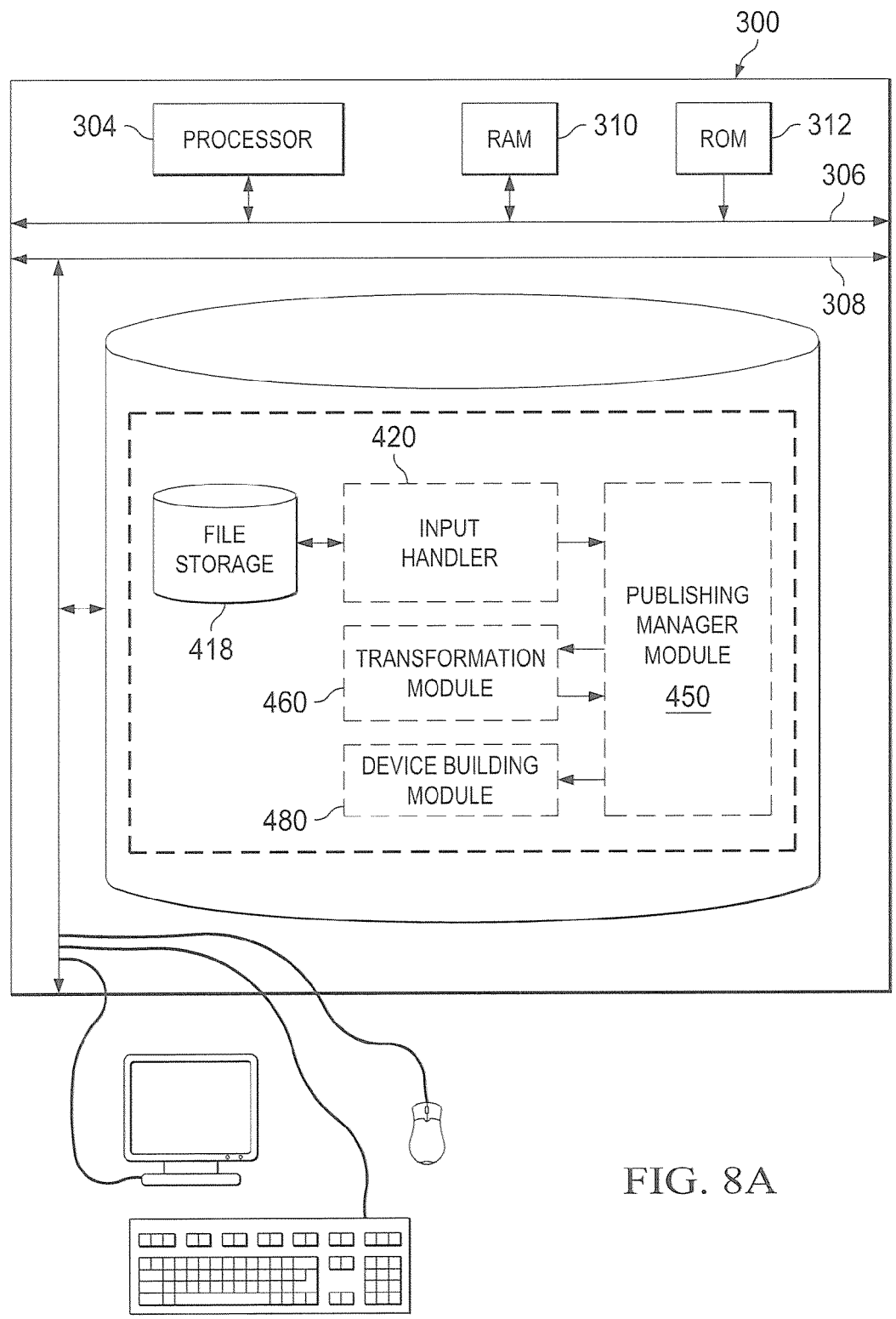
FIG. 8A is a block diagram of the computer system that executes the digital media conversion and integration system.

Referring now to FIG. 8A, a digital media conversion system 400 which utilizes computer system 300, which includes a microprocessor 304, and which is coupled to a high speed local or memory bus 306 and an I/O bus 308. Of course, buses 306 and 308 are shown for the purposes of illustration and can be implemented in a variety of fashions. Coupled to the memory bus 306 is random access memory (RAM) 310 and read only memory (ROM) 312, both of which are instances of computer readable media. Coupled to the I/O bus 308 are a number of peripherals such as a keyboard 314, monitor 316, network card 318 and other computer readable media 320. The computer readable media 320 can take a variety of forms such as a hard disk drive or optical read/write systems, etc. The microprocessor 304 typically operates under program control stored in the various computer readable media 320. System 400 is stored in the computer readable media 320 except for the communications devices 402 404, the communications system 490, the data storage 492, and the network server 496, which may be located on other computers.

Figure 8B:
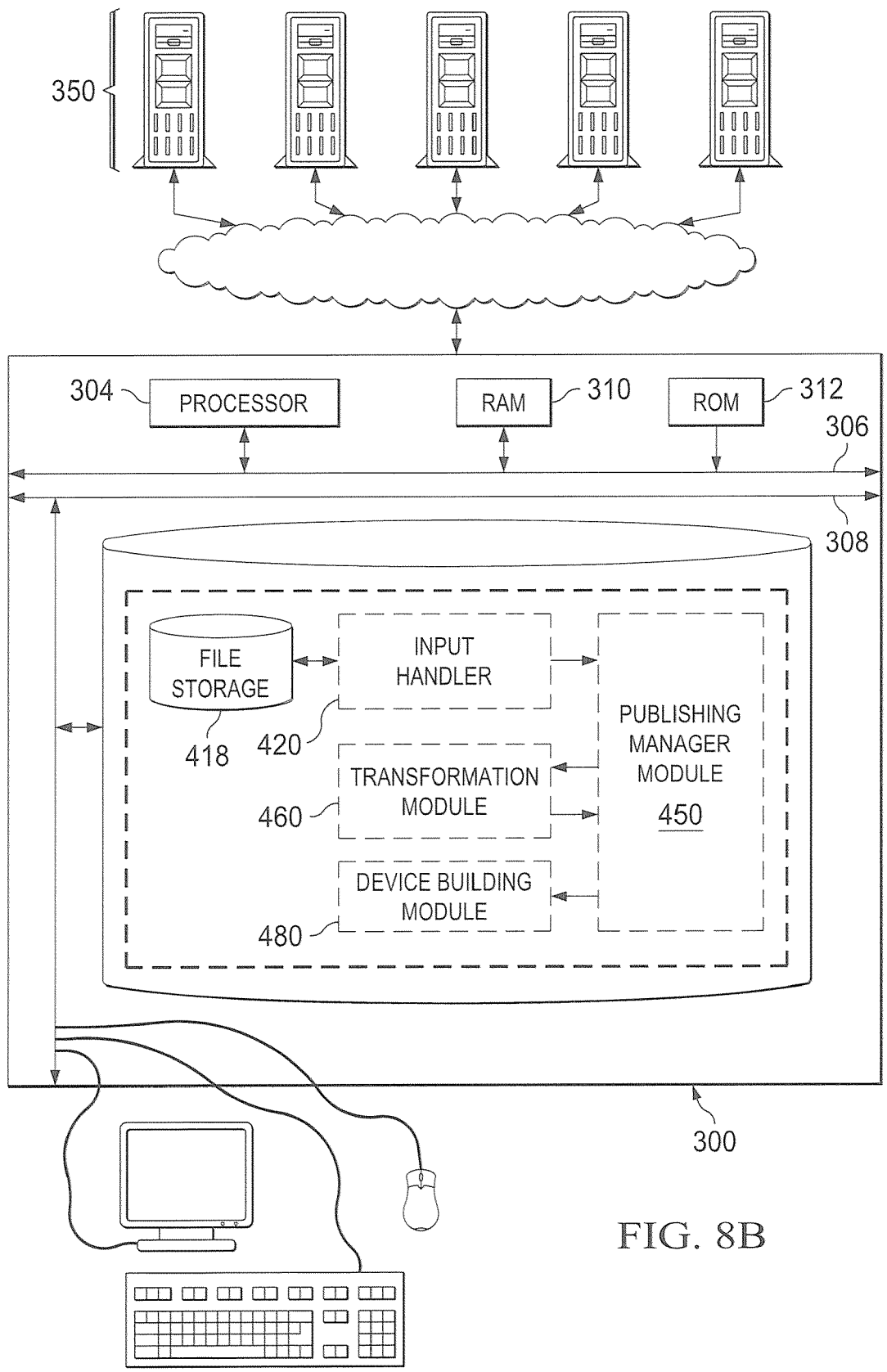
FIG. 8B is a block diagram of the digital media conversion system interacting with the Internet and a personal computer.

Referring now to FIG. 8B, an expanded digital media conversion system 400, in which computer system 300 interacts with one or more customer personal computers 350 all of which are connect to computer networks 405, which is most likely the Internet.

Those skilled in the art of digital media programming would appreciate that the digital media conversion system 400 is a distributed system that runs on multiple platforms. Such as system is indicated by FIG. 6C, and such as system 400 may be implemented by a plurality of computer systems 300 which are connected by a network 390, which is usually the Internet 494, but can be one or more local area networks or a wide area network 496. The implementation of a distributed system allows the conversion system 400 to easily support the requirements of many different media formats and output players.

Figure 9:
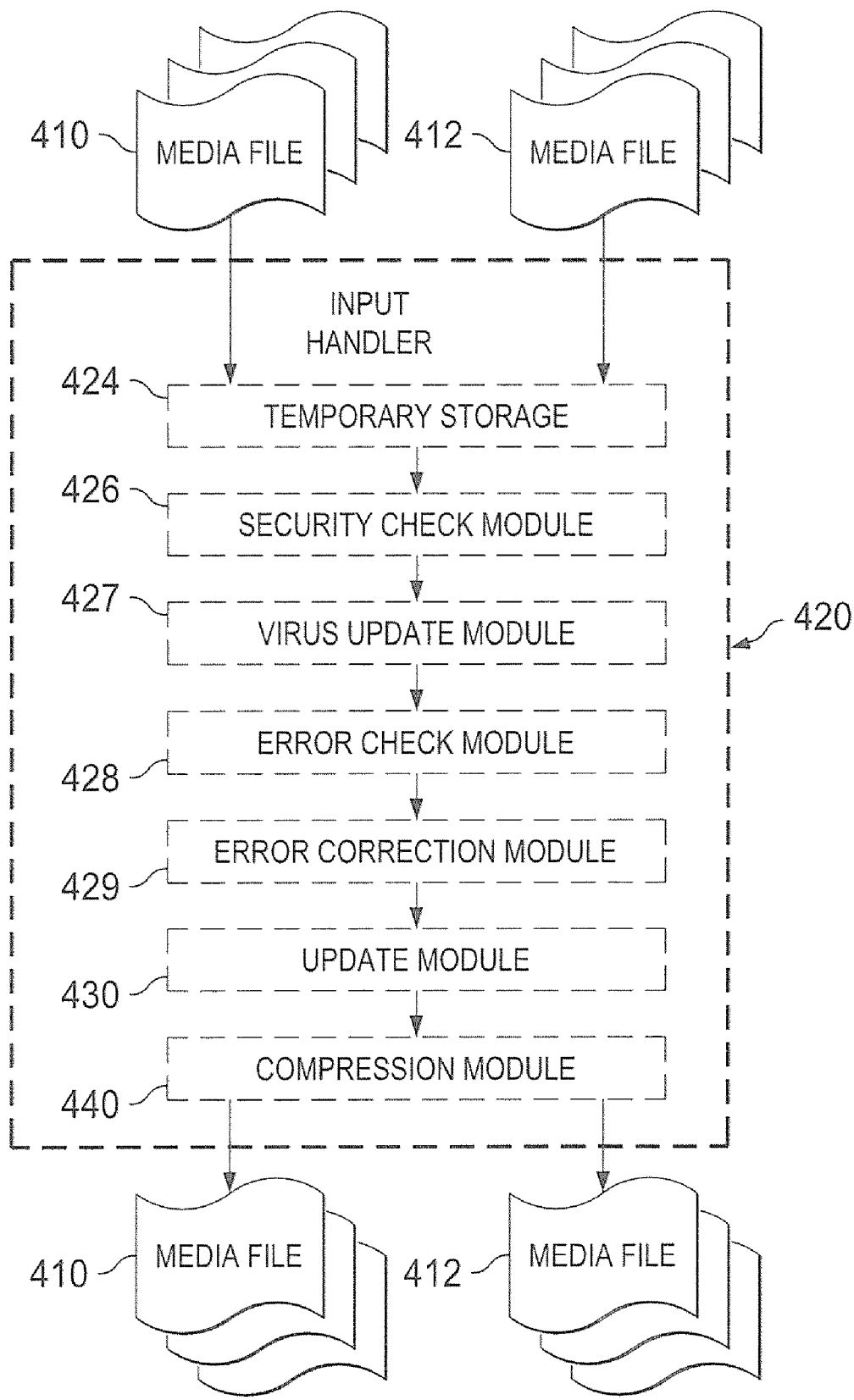
FIG. 9 is a block diagram of an input handling module.

Referring now to FIG. 9, an input handler module 420, which consists of temporary data storage 424, a security checking module 426, a virus update module 427, a file error checking module 428, a file error correction module 429, a update test module 430, and a compression module 440.

The digital files are uploaded from the user's computer 350 through the Internet 405 to the temporary data storage 424. The data storage is kept apart from the rest of the modules in case the file is infected with a computer virus. The files are then run through the security-checking module 426 to determine if they are infected with a virus. If the files contain a virus that cannot be remedied, the user is notified via the Internet or email 405 that the digital media files must be replaced and reloaded. The security-checking module 426 is continually updated on new viruses and other computer infectants by the virus update module 427. If the files are not infected they are so marked and then placed on the in the file error checking module 428, where the digital media files are checked to see that they can be read and converted properly.

If one of the digital media files 410 or 412 contains an error that cannot be corrected by the system 400, the user is informed via the Internet or email 405 that the file must be corrected and reloaded. The digital media files also go through the update module 430 which checks to see if the media file is the most current version. If the version of the digital media files 410 and/or 412 is not current, then the system will update and convert to the most current version of the media using either a custom update system or actually activating the proprietary software.

After at least one of the files 410 and/or 412 has been updated to the most current version of the digital media file, at least one of the files 410 and/or 412 is then passed to the compression module 440 and compressed. Compression of digital media files is well known by those skilled in the art of media software programming and can be achieved in many different ways, including using proprietary compression software made by a third party and used under license. Please note that the file error checking module 428 and the update module 430 may be combined into one module, but their function are detailed separately for the purposes of enabling one of ordinary skill in the art to implement the invention.

Also included in the input handling module is an optional digital media update module 430, which consists of a media type sorter 432, and update checking module 434, and an update module 436. A digital media file 410 enters the update module 430, at which time it is encountered by the media sorter 432, which determines what type of digital media file it is (MPEG, Powerpoint, etc.). It then transfers the digital media file to the correct update checking module to determine if the file is in the most current version (or a version which can be converted by the system). It is current then the system exits the digital media update module 430 without altering the digital media files 410 and/or 412.

Figure 10:
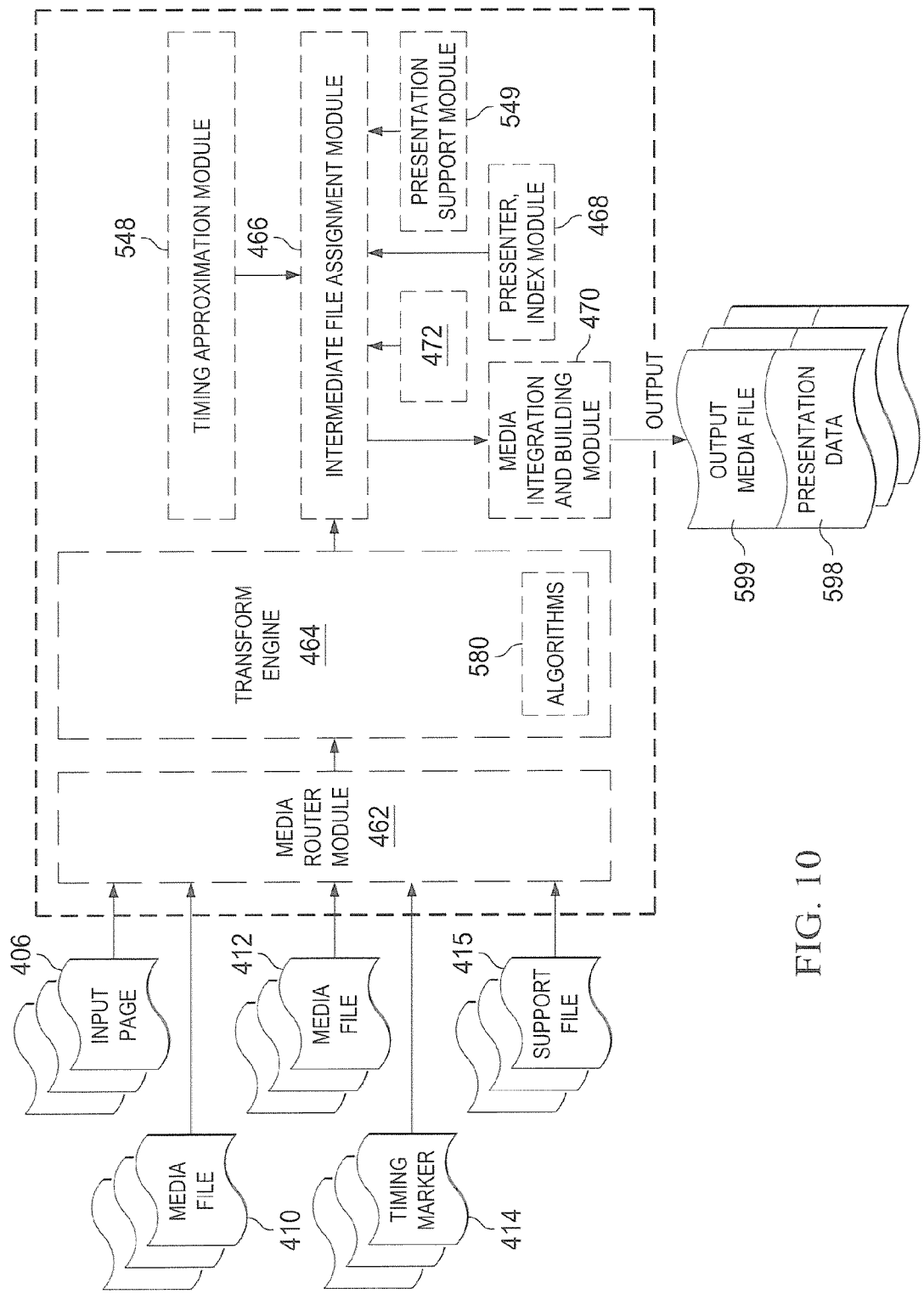
FIG. 10 is a block diagram of the digital media transformation module.

Referring now to FIG. 10, a digital media transformation module, 460, which includes digital media files 410, 412, a timing file 414, and a presentation support file 415, a customer output request 406, a media router module 462, a transform engine 464, which contains up to 15 media breakdown modules 502-516, an intermediate media file assignment module 466, a media integration and building module 470, which contains up to 19 output modules, 561-579, an presentation indexer module 468.

The digital media transformation module 460, also referred as the transform engine(s), is a series of complex computer code segments that are responsible for changing the incoming media files 410, 412 into the desired media output format 406. The incoming digital media data files (410, 412) are routed to the digital media transformation module by the publishing manager module 450 from the input handler module 420.

The transform engines 460 break the digital data media files 410, 412 into their low level components, translate the low level components into a intermediate format, and integrate the intermediate formats where possible. There are intermediate formats which will not be able to be integrated. Although, such situations would normally have been screened out by the input handler module 420 or the publishing manager module 450. The transform engines 460 also can take a timing file 414 or presentation support files 415 and breakdown their components in order to integrate them into the output presentation file so that two different media can be synchronized without further authoring.

The media router module 462 determines what format of media files 410, 412, 414, and 415 needs to be transformed to the desired output format 406 and transfers the data contained in the file to the appropriate media breakdown module in the transform engine 464, which contains all the individual breakdown modules. Table 1 below indicates how the media router module 462 will assign different media file inputs to desired input media breakdown modules, which is not meant to be a comprehensive list of all media formats covered by the present invention, but serves to illustrate how the media router module 462 assigns the digital media files to specific modules which will break down the particular format of the digital media file input into components which then can be integrated.

Although the specific media breakdown modules 502-516 are assigned to a specific input-output category as indicated by Table 1, a skilled computer programmer will realize that many of these media specific transformation modules 502-516 will use common algorithms 580 in order to transform the digital media file to the desired output (or desired multiple output formats, such as both XML and a Flash presentation).

The diagram in FIG. 10 of the transform engine 464 is depicted as one module, but is comprised of many smaller modules 502-550 and a common algorithm module 580, but each module may use some the same algorithms as other breakdown modules to perform the procedures necessary to get the incoming media files into an intermediate digital format. The modules can share algorithms because each individual "breakdown" procedure may have common characteristics with other "breakdown" algorithms, such a decompression, data structure recognition (i.e. color bit, grayscale bits, etc). Of course, particular media breakdown modules such as powerpoint breakdown module 502 have modules which will work only for the specific media file and cannot share specific algorithms. Other algorithms may include data pattern recognition algorithms which find data which fits a particular pattern and the module can recognize as a certain type of media input, such as a volume instruction on an audio file, or a color palette in a picture.

In some instances the Intermediate-level media will include timing signals extracted from the digital media files 410-412. This extraction can be supported by data in the digital media file itself, where such a file would inherently support a timing signal, such as the break between Powerpoint® slides. In other instances, a timing signal mechanism will be provided by an external file or a timing approximation module 548 which will provide the timing signals for synchronizing a portion of a audio file with a specific slide or a particular slide with an animation file segment. The presentation support module 549 will break down other information such as text or graphics which can be later integrated into the intermediate level digital file.

Although the intermediate format of the converted media will usually be in Extensible Markup Language (XML), a skilled programmer will realize that different intermediate formats may be more appropriate for other digital media conversions. Such other intermediate formats may include platform-based standards (as opposed to proprietary standards like Real® Windows Media®) like M-JPEG, MP-3, etc. which are commonly utilized by commercial players and other Internet devices for media displays. The typical format for the digital media output of the will consist of a presentation-ready files like XML, DHTML, Flash®, Powerpoint® with add-ons, etc. Segments of digital video, graphics, and digital audio files are synchronized by the media synchronizer 478.

As will be appreciated by those skilled in the art of computer programming, the present invention's ability to break down the digital media file into its components, allows for the manipulation of the resulting data structures to be reconstructed in a different scale. The break down and reconstruction algorithms also allow the present invention to support a greater number of output formats than any of the prior art is able to because reconstruction of the digital media is far more versatile. Additionally, because of these techniques, no other prior art is able to convert animations.

TABLE 1A

Module execution assignments for media file inputs and outputs

| First Digital Media input | Second Digital media input | Third Digital Media Input | Intermediate format | Desired Output Digital Media | Module Assigned |
|---|---|---|---|---|---|
| Power-point® | | | XML | Flash® | 502 |
| Audio file | | | proprietary | Flash® | 503 |
| Audio Timing | | | XML | Flash® | 504 |
| Animation Timing | | | XML | Flash® | 505 |
| Power-point® | | | XML | HTML/ DHTML Presentation | 502 |
| Audio file | | | proprietary | Hotmedia (G.723) | 503 |
| Audio file | | | proprietary | Sun au | 503 |
| Audio file | | | proprietary | ADPCM | 503 |
| Audio Timing | | | XML | HTML/ DHTML Presentation | 504 |
| Animation Timing | | | XML | | 505 |
| Support-ing presen-tation infor-mation | | | XML | HTML/ DHTML Presentation | 506 |
| Power-point® | Sup-port-ing presen-tation infor-mation | | | Database | 507 |
| Power-point® | | Audio | XML | Flash® with audio | 508 |
| Power-point® | | Audio | XML | HTML/ DHTML Presentation | 508 |
| Star Office | | | | HTML/ DHTML Presentation | 509 |
| Power-point® | Flash® | | None | | 510 |
| Power-point® | Quick-time | | XML | | 511 |
| M-JPEG-A | Power-point | | XML | | 512 |
| M-JPEG-B | Power-point | | XML | | 513 |
| Flash® | Audio | | | Flash® with audio | 514 |
| Audio | | | None | Real | 515 |
| Audio | | | None | Windows Media | 516 |

Figure 11:
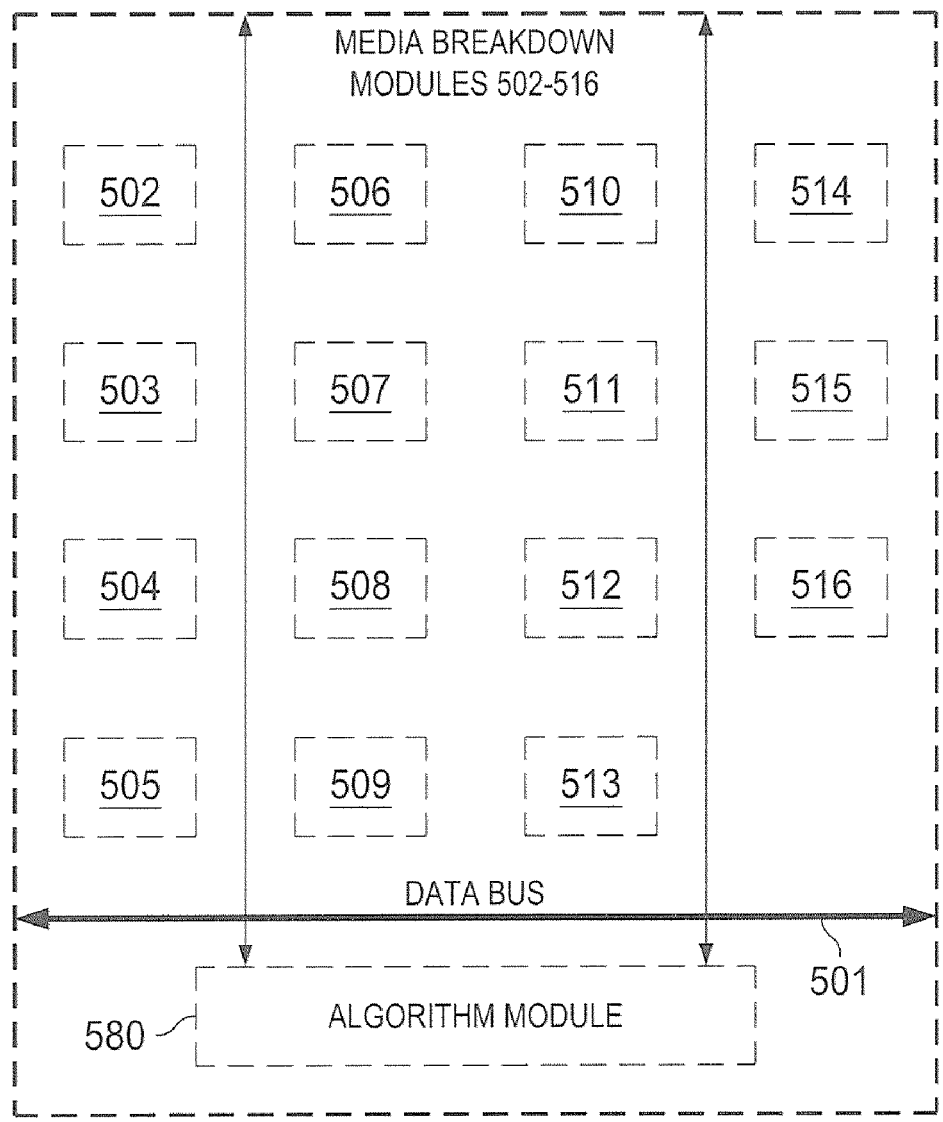
FIG. 11 is a block diagram of the digital media transform engine.

Referring now to FIG. 11, a digital media transform engine 464, which is comprised of specific media breakdown modules 502-516, a data bus 501, and a common algorithm module 580. Tables 1A and 1B indicate which formats can be broken down by the individual modules.

Figure 12:
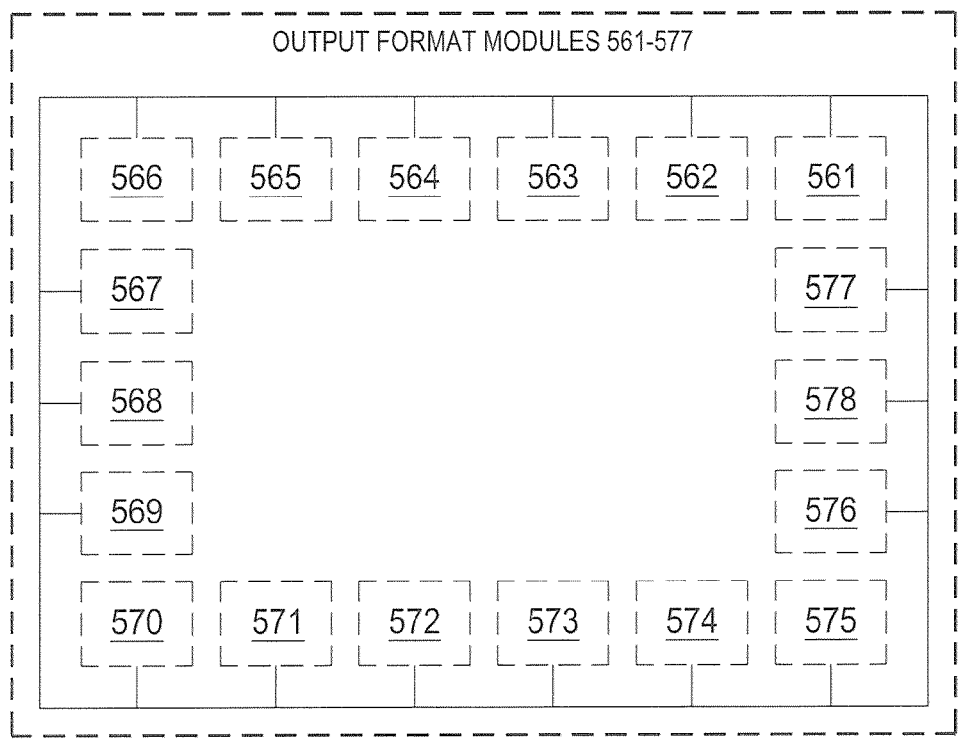
FIG. 12 is a block diagram of the digital media integration module.

Referring now to FIG. 12, a digital media integration module 470, which is comprised of specific output format modules 562-580, and a data bus 471. Tables 2A-2E list the formats supported by the digital integration media module.

TABLE 2

A–E Output module format assignments.

| Intermediate format | Secondary Intermediate format | Tertiary Intermediate format | Integrated-Converted format | Module assigned |
|---|---|---|---|---|
| A. Presentation format Flash ® Player with 32k bits per second audio, Flash 4.0 or above plug in required for the viewer: | | | | |
| XML | | | ® with animations | 561 |
| proprietary audio | | | 32 kbps MP3 | 562 |
| Proprietary Audio | Flash ® | Timing Information | Flash ® | 563 |
| Flash | Proprietary audio | timing | Flash ® | 564 |
| B. Presentation format Flash Player with 24k bits per second audio, Flash 4.0 or above plug in required for the viewer: | | | | |
| XML | | | Flash with animations | 565 |
| proprietary audio | | | 24 kbps MP3 | 566 |
| Flash ® | Proprietary audio | timing | Flash ® | 567A |
| Proprietary Audio | Flash ® | Timing Information | Flash ® | 567B |
| C. Presentation format HTML/DHTML presentation with 8k bits per second audio, no plug-in required for the viewer: | | | | |
| XML | Timing | | DHTML | 568 |
| Proprietary audio | | | Hotmedia (G.723) | 569 |
| Proprietary Audio | DHTML | Timing Information | DHTML and (G.723) | 570 |
| D. Presentation format HTML/DHTML player with 32 kbs .au audio, no plug-in required for the viewer: | | | | |
| XML | Timing | | DHTML | 571 |
| Proprietary audio | | | Sun au | 572 |
| Proprietary AudioAudio | DHTML | Timing Information | DHTML and Sun au | 573 |

E. Other Output formats supported, with accompanying presentation format:

| Intermediate format | Secondary Intermediate format | Tertiary Intermediate format | Integrated-Converted format | Presentation Format | Module Assigned |
|---|---|---|---|---|---|
| XML | Timing | | Flash ® | Flash ® with multiple audio rates | 574 |
| XML | Audio | Timing | Flash ® | Flash ® with real media | 575 |
| Flash | Audio | | Flash ® | Modified flash for PDA, with 32 kbs sound | 576 |
| Audio | | | Real ® Media | | 577 |
| Audio | | | Windows ® Media | | 578 |
| XML | Audio | Timing | Flash ® | Flash ® with windows media | 579 |

Please note that the above table is a list of format conversions and integration supported by the invention at the time of this patent application. The applicant's complex breakdown media modules 502-550 and integration modules 560-580 will be able to handle conversions for software not on the market at this time.

Additionally because the digital media files are stripped to their constituent components, the minimal amount of components can be combined to reconstruct an output presentation file. Thus, the present invention will use much less bandwidth than prior art to get the same quality of output presentation. For example if a frame only needs to have text "delivered" then the presentation will not send the entire graphic for a frame, whereas other prior art would deliver the entire frame using more bandwidth.

Figure 13:
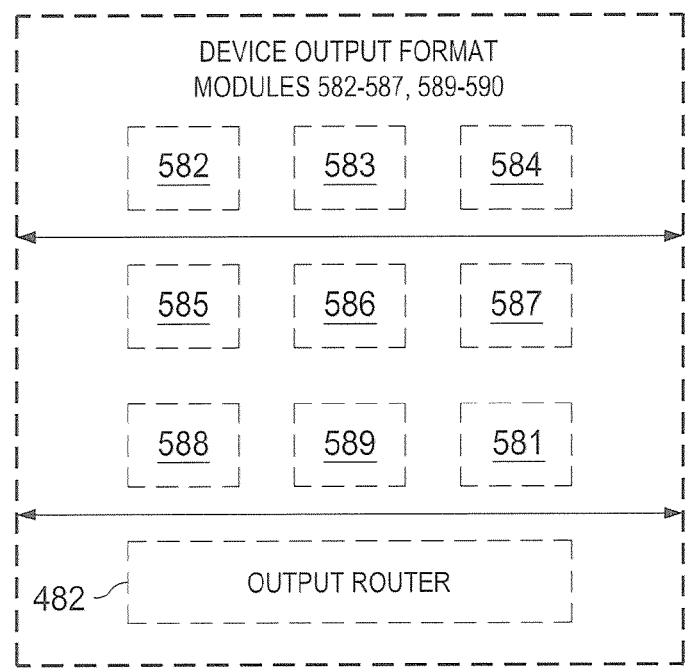
FIG. 13 is a block diagram of the device building module.

Referring now to FIG. 13, a device building module 480, which contains an output router 482, a data bus 481, and various device output format modules 582, 583, 584, 585, 586, 587, 589, and 590. The output router module distributes the digital media output file 599 to every device building that that customer requested. Table 3 indicates which modules are assigned based on the requested device. It is expected that multiple device output formats will be assigned at the request of the consumer.

TABLE 3

Output device builder module assignments:

| Device Output format | Module Assigned |
|---|---|
| Powerpoint ® with Audio, Internet presentation | 582 |
| Web presentation, no player | 583 |
| Web presentation with proprietary player | 584 |
| Cell/Digital Phone Screen | 586 |
| PDA Screen | 587 |
| MP3 Only | 590 |
| File storage only | 585 |

The device-building module 480 puts the output digital media file in whatever presentation format was requested by the user when entered into the consumer request input 406. So if the user chose "all" in the consumer request input 406 for "devices to enable" then the device building module 480 determines which conversions the digital media file output can be placed into and would activate all available devices. The output file 599 travels along the data bus 481 in order to get to the specific module for conversion to a specific electronic device.

Such conversion technology is prevalent in "web clipping" software technology which allows complicated graphics and text to be displayed on device with very little memory or display capability, such as cell phones or personal digital assistants (PDAs). These web clipping applications do not convert complicated graphics for cell phones, but essentially remove graphics that would use too much display memory on such a device with limited memory. However, it may not be possible for all output formats to be available for all devices. For example, a cell phone screen simply would not have enough memory resources to display a Flash® output presentation file.

Figure 14:
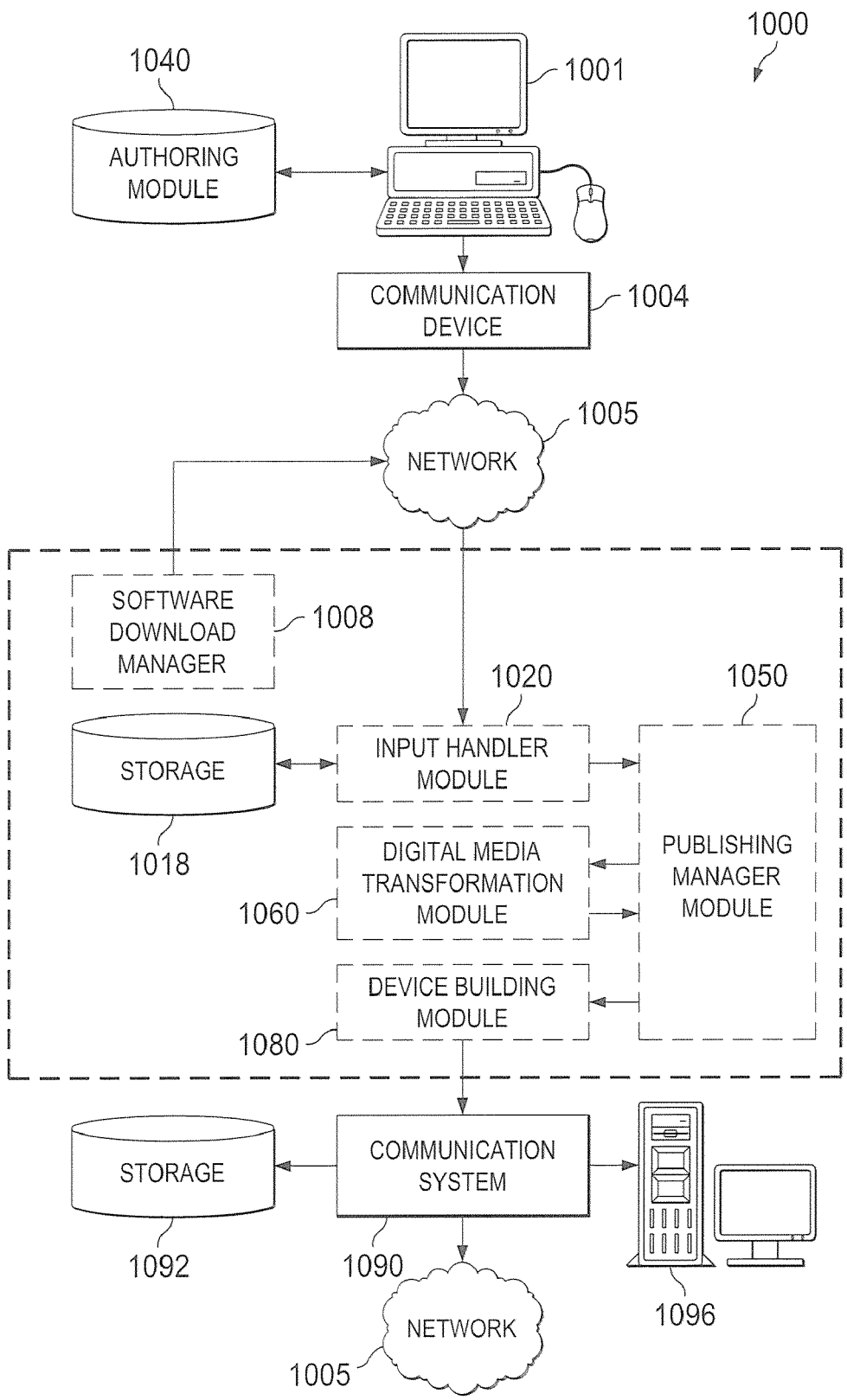
FIG. 14 is a block diagram of the alternate embodiment with the personal computer media production module.

Referring now to FIG. 14, an alternate embodiment, a digital media conversion and integration system with authoring tools 1000. The system includes a personal computer 1001 connected to the Internet through a communications device 1004. The digital media conversion and integration system is connected to the Internet or other appropriate computer network 1005 through a communications device 1006. A software download manager 1008 stores the software to be run on a personal computer 1001.

Other components of system 1000 are similar to the system depicted in system 400, consisting of an input handler module 1020, a publishing manager module 1050, a digital media transformation module 1060, a device building module 1080 and communication system, 1090, data for digital media storage. Other delivery mechanisms include an optional web server 1096, which get files by a email system 1097 and a communications device connected to the Internet 1098. An executed install of the authoring tool software, results in the placement of authoring module 1040 install in personal computer 1001 memory 320 and executed by the CPU 304.

The digital media conversion and integration system with authoring tools 1000 resembles system 400 in many ways with one important distinction: software is downloaded from the digital media conversion system to a personal computer 1001 (or other appropriate authoring hardware device) and much of the conversion process takes place on the user's personal computer 1001, through the execution of the authoring module 1040 before the digital files are uploaded to the system 1008.

Figure 15:
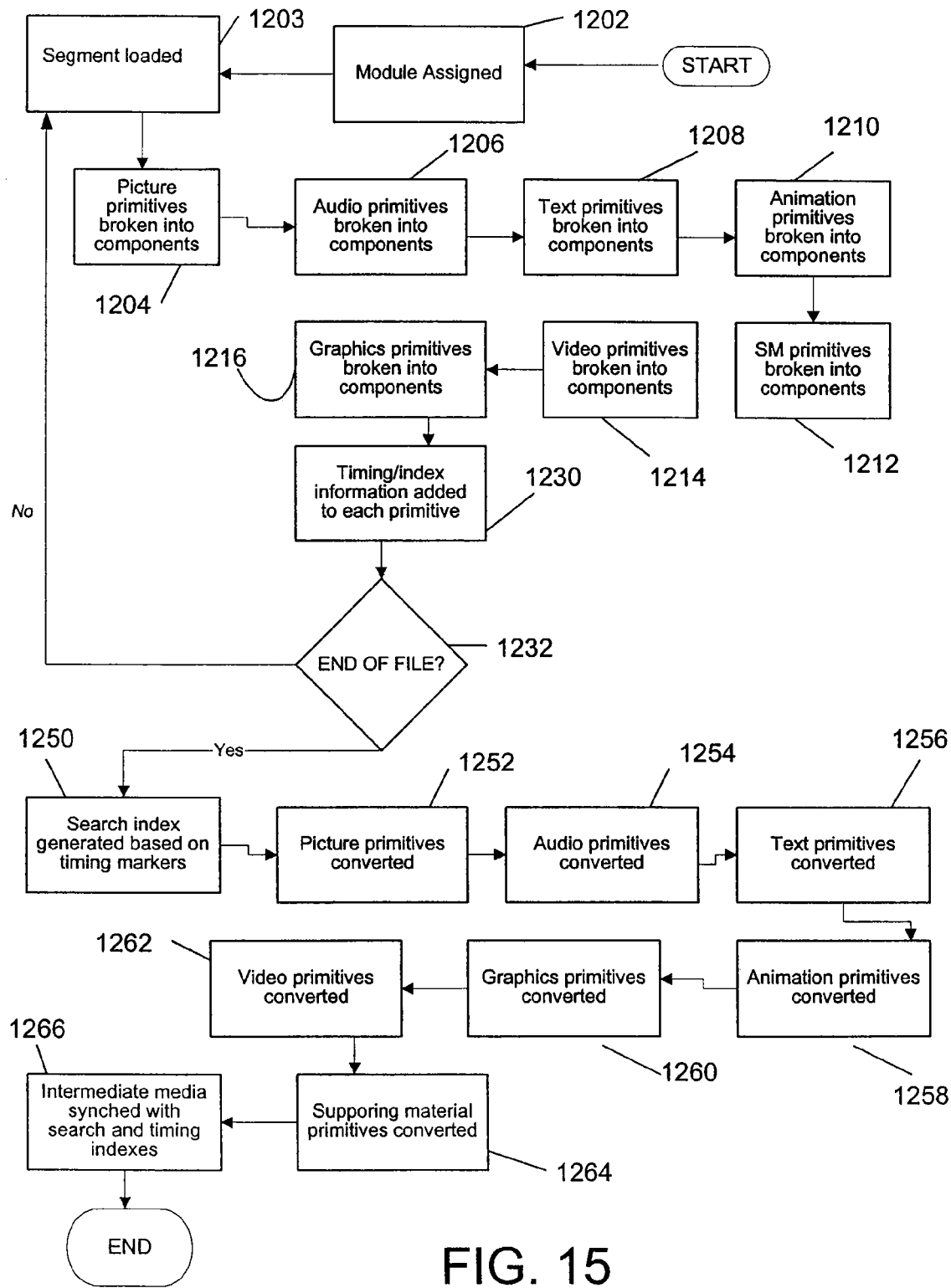
FIG. 15 is a flow diagram of the steps involved in the transformation module process.

Referring now to FIG. 15, a detailed process digital media file breakdown step 940. In step 1202 a particular digital media file type is assigned to a particular breakdown module. In step 1204 the file is examined for picture primitives and the picture primitives are broken down into components. In step 1206 the file is examined for audio primitives and the audio primitives are broken down into components. In step 1208 the file is examined for text primitives and the text primitives are broken down into components. In step 1210 the file is examined for animation primitives and the animation primitives are broken down into components. In step 1212 the file is examined for graphics primitives and the graphics primitives are broken down into components. In step 1214 the file is examined for video primitives and video primitives are broken down into components. In step 1216 the file is examined for supporting material primitives and the supporting material primitives broken down into components.

In step 1230 the timing information recorded, all components derived from the primitives are marked with timing markers and indexed on an array. In step 1232 steps 1204-1230 repeated until the end of file is reached, and in step 1250 a search index generated based on timing markers and index arrays. In step 1252 the picture components are converted to intermediate level format. In step 1254 the audio components are converted to intermediate level format. In step 1256 the text components are converted to intermediate level format. In step 1258 the animation components converted to intermediate level format. In step 1260 the graphics components converted to intermediate level format, and in step 1262 the video components are converted to intermediate level format. Those skilled in the art will appreciate that there will be different methods which can implement the search, breakdown, indexing, timing marker placement, and converting functions.

Additionally, the invention allows the user to choose from a variety of payment options. In one embodiment a user can pay a monthly fee and become entitled to a set amount of presentations per month, or an unlimited amount. In another embodiment, the user pays a set amount, which can vary by format, and the user will be entitled to convert a digital media file. The invention allows for the use of a credit card number to be transferred and verified over the Internet as well for all of these payment options. Submitting financial information to any entity about a credit card over the Internet to effect payment for services or downloadable software is well know to persons in the art, and although it is part of the present invention in one embodiment, it can be appreciated that this aspect can be executed in a variety of ways.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

We claim:

1. A method comprising:
    receiving a presentation file;
    automatically identifying primitive components in said presentation file, wherein said primitive components include audio primitive components, picture primitive components, graphic primitive components, and supporting material primitive components;
    automatically decomposing said primitive components into sub-components;
    automatically converting each of said sub-components of said decomposed primitive components into corresponding intermediate format components;
    integrating said intermediate format components into a single output presentation file corresponding to each target format of a plurality of target formats, wherein said integrating said intermediate format components includes adding timing information and presentation support information;
    adapting and routing a final output to a corresponding output device, wherein adapting includes adjusting said single output presentation file to fit bandwidth requirements of each selected one or more output devices; and
    controlling scheduling conversion and integration processes associated with producing said final output corresponding to said each target format.

2. The method of claim 1, said presentation file comprising a POWERPOINT® format presentation application file.

3. The method of claim 1, wherein one of said plurality of target formats comprises a FLASH® format multimedia application file.

4. The method of claim 1, further comprising: serving said output presentation file as a web presentation.

5. The method of claim 1 further comprising adapting said single output presentation file corresponding to each target format for viewing by a third party using different networking technologies, including wired, guided or line-of-sight optical, and radio frequency networking over any network including a wide area network, a local area network, a wireless network, a public switched telephone network, or the Internet.

6. The method of claim 1 further comprising requiring monetary remuneration in exchange for converting said presentation file into said plurality of target formats.

7. A computer-implemented method for converting multi-media content into a plurality of target formats to deliver to one or more selected output devices, the method comprising the acts of:
    receiving one or more input multi-media content files;
    automatically identifying multi-media type primitive components in said one or more input multi-media content files, wherein said multi-media type primitive components include audio primitive components, picture primitive components, graphic primitive components, and supporting material primitive components;
    automatically decomposing said multi-media type primitive components into sub-components
    automatically converting each of said sub-components of said decomposed multi-media type primitive components into corresponding intermediate format components;
    integrating said intermediate format components into a single output presentation file corresponding to each target format of said plurality of target formats, wherein the integrating said intermediate format components includes adding timing information and presentation support information;

adapting and routing a final output to corresponding output device, wherein adapting includes adjusting said output presentation file to fit bandwidth requirements of each selected output device; and controlling scheduling conversion and integration processes associated with producing said final output corresponding to each target format of a plurality of target formats.

8. The computer-implemented method of claim 7, further comprising adapting said single output presentation file corresponding to each target format for viewing by a third party using different networking technologies, including wired, guide or line-of-sight optical, and radio frequency networking over any network including a wide area network, a local area network, a wireless network, a public switched telephone network, or the Internet.

9. The computer-implemented method of claim 7, further comprising requiring monetary remuneration in exchange for converting said multi-media content into said plurality of target formats.

* * * * *